US012634612B2

(12) United States Patent
Mehrbach

(10) Patent No.: US 12,634,612 B2
(45) Date of Patent: May 19, 2026

(54) ACOUSTICAL DAMPING SYSTEM FOR HEADPHONES

(71) Applicant: Zachary Arthur Mehrbach, Lyons, IL (US)

(72) Inventor: Zachary Arthur Mehrbach, Lyons, IL (US)

( * ) Notice: Subject to any disclaimer, the term of this patent is extended or adjusted under 35 U.S.C. 154(b) by 276 days.

(21) Appl. No.: 18/497,552

(22) Filed: Oct. 30, 2023

(65) Prior Publication Data

US 2024/0064450 A1 Feb. 22, 2024

Related U.S. Application Data

(63) Continuation of application No. 17/652,803, filed on Feb. 28, 2022, now Pat. No. 11,805,348.

(51) Int. Cl.
*H04R 25/00* (2006.01)
*G10K 11/00* (2006.01)
*H04R 1/10* (2006.01)

(52) U.S. Cl.
CPC ......... *H04R 1/1008* (2013.01); *G10K 11/002* (2013.01); *H04R 1/1058* (2013.01)

(58) Field of Classification Search
CPC .. G10K 11/002; H04R 1/1008; H04R 1/1058; H04R 1/1083; H04R 1/288
USPC ........................................................ 381/371
See application file for complete search history.

(56) References Cited

U.S. PATENT DOCUMENTS 7,466,838 B1 * 12/2008 Moseley .............. H04R 1/1008 381/74
2014/0334656 A1 * 11/2014 Lu ............................ H04R 1/10 381/370
2018/0103309 A1 * 4/2018 Ozawa ................. H04R 1/1075

* cited by examiner

*Primary Examiner* — Phylesha Dabney
(74) *Attorney, Agent, or Firm* — Dunlap Bennett & Ludwig PLLC

(57) ABSTRACT

A damping system for an ear cup headphone design. The damping system introduces a completely enclosed inner acoustic volume in the rear volume of the ear cup by way of supporting a baffle damper spaced apart from the driver of the ear cup, wherein the density of the baffle damper diffuses acoustic wave rearwardly emanating from the driver. Additional damper masses of different relative densities may occupy the rear volume rearward of baffle damper.

19 Claims, 5 Drawing Sheets

ACOUSTICAL DAMPING SYSTEM FOR HEADPHONES

CROSS-REFERENCE TO RELATED APPLICATION

This application claims the benefit of priority, as a Continuation, of U.S. non-provisional application Ser. No. 17/652,803, filed 28 Feb. 2022, the contents of which are herein incorporated by reference.

BACKGROUND OF THE INVENTION

The present invention relates to acoustical damping systems and, more particularly, an acoustical damping system for small acoustic spaces, embodying a method for improving the sound quality of headphones.

Headphones usually include a pair of earcups interconnected by a headband. The earcup is dimensioned and adapted to completely circumscribe or surround a user's ears when worn. These type of "over-ear" headphones can include earcups of a closed-back or open-back design, or anything in-between which can also be called semi-open. Closed-back earcups have acoustically sealed backs. Open-back earcups have backs acoustically open to the external environment and thus open to ambient noise surrounding the earcups.

The earcup provides an acoustic driver/vibrating diaphragm for creating the sound appreciated by the wearer's ear. Because sound is a vibration that propagates as an acoustic wave through a transmission medium (e.g., air) all drivers will emit sound to the rearward direction via a negative impulse response. Sometimes the driver may provide rear ports, though some do not, to effectuate this rearward moving acoustic wave.

As a result, over-ear headphones typically encounter issues related to standing waves and frequency response disruption caused by sound waves bouncing off the surfaces of the cup housing that defines internal air/acoustic volume (s). Closed headphones have further disadvantages due to the closed design of the earcups. In some over-ear headphones, standing waves may develop inside the acoustical volume (e.g., an air volume encapsulated inside the earcup between the earcup and the wearer's circumscribed ear), which can degrade sound quality considerably.

A standing wave may be formed when two identical waves move in opposite directions along a line—i.e., a wave form that does not travel through space or along a string even though (or because) it is made up of two oppositely traveling waves. The resulting standing wave is sinusoidal, like its two component waves, and it oscillates at the same frequency. When this happens, certain frequencies are cancelled out, causing dips and peaks in the frequency response, and engendering an undesirable resonance in the frequency response of the headphones.

As mentioned above, in small acoustical volumes, such as those found in headphones, standing acoustical waves can accumulate in the earcups volumes bouncing freely and creating sound that is not pleasant to the ear. More specifically, there are at least two separate air volumes in one earcup: a front volume—i.e., the volume of air forward the driver, between the driver plate of the earcup and a wearer's ear; and a rear volume, which is the air volume rearward of the driver plate.

Current damping systems either target the front volume, target the inner surfaces of the earcup chamber, or directly dampen (through engaging) a rear surface of the driver. As a result, current damping systems do not take care of the related issues of dynamic resonance frequency/impulse response manifesting in the rear volume without making direct contact to the driver or cup surface. Current damping systems, therefore, also do not have the ability to control (e.g., via diffusion) the airflow through the rear volume; specifically, current headphone damping systems are not enabled to control rearward airflow/acoustic waves that directly leave the rear portion of the dynamic driver.

As can be seen, there is a need for an acoustical damping system for small acoustic volumes, embodying a method for improving the sound quality of headphones, wherein the acoustical damping system dampens a rear volume of a headphone earcup without applying damping directly to any surface or at least the rear surface of the driver, thereby providing for a complete acoustical damping system that allows the manufacturer more control over the acoustic system.

By utilizing the damper system embodied in the present invention, the standing waves are lessened because they are diffused evenly, causing a much smoother and more desirable frequency response. The acoustical damping system directs airflow from the rear portion of the dynamic driver, in part, through defining a new "inner" acoustic volume between the dynamic driver and a systemic baffle damper, whereby this inner acoustic volume retains sound pressure, which in turn increases dynamic impulse response, making for a smoother overall frequency response and a more pleasant listen experience. In other words, instead of the rear volume of the headphone earcup being completely open and placing the sound vibrational damping material either directly on the driver or on the rearward wall of the earcup (along the perimeter of the rear volume), the damping is placed in a space "in-between" which allows a variable control of the diffusion of sound waves between the driver and the rear of the earcup.

The present invention circulates airflow through diffusions, spreading it out so that peaks and valleys that create unwanted user-perceived responses are lessened, making for a more pleasant listening experience. Sound waves come out of the rear of a headphone driver, whether it be through the magnet, or from the negative impulse response of the driver. The new inner rear volume defined by the systemic baffle damper spaced apart rearward of the driver, enables the acoustical damping system of the present invention to both "catch" this airflow and directs it out of the new inner acoustic volume to the remaining outer rear acoustical volume, so that unwanted energy is, in effect, controlled. The acoustical damping system works in conjunction with the headphone earcup.

The headphones damping system embodied in the present invention can be applied to any headphone to improve the sound subjectively and objectively.

SUMMARY OF THE INVENTION

In one aspect of the present invention, a damping system for a rear volume of an ear cup includes the following: a driver; a housing, in conjunction with the driver, defining the rear volume; and a baffle damper disposed rearward of the driver in such a way as to define an enclosed inner acoustic volume, and wherein the baffle damper is spaced apart forward of a rear portion of the housing, wherein the baffle damper has a Pores Per Inch (PPI) density of less than 100, wherein the baffle damper is spaced apart from the driver by a maintain distance having a range between one and ten millimeters, wherein the maintain distance is substantially uniform; and further including a driver holder engaging both the driver and the baffle damper, and wherein the driver holder circumscribes the enclosed inner acoustic volume, wherein the baffle damper is substantially concentric with the driver, wherein a forward surface of the baffle damper is substantially coextensive relative to a rearward surface of the driver; and further including a first damper mass spaced apart forward from the rear portion of the housing, wherein the first damper mass is spaced apart rearward of the baffle damper, wherein the first damper mass is concentric relative to the baffle damper; and further including a second damper mass rearward of the first damper mass and in a stacked orientation relative thereto, and wherein the second damper mass is concentric relative to the baffle damper, wherein the baffle damper has a baffle density, wherein the baffle density is lower than a first density of the first damper mass, and wherein the first density is approximately fifty percent lower relative to a second density of the second damper mass, and wherein the housing defines a closed-back design.

In another aspect of the present invention, a damping system for a rear volume of an open-back ear cup includes the following: a driver; an open-back housing circumscribing the driver; and a baffle mass disposed rearward of the driver in such a way as to define an enclosed inner acoustic volume, wherein the baffle damper has a Pores Per Inch (PPI) density of less than 100, wherein the baffle mass is spaced apart from the driver by a maintain distance having a range between one and ten millimeters; further including a baffle holder engaging both a driver holder of the driver and the baffle mass, and wherein the driver holder circumscribes the enclosed inner acoustic volume, wherein the baffle mass has a dome-like shape that defines a rear portion of the enclosed inner acoustic volume, wherein the baffle mass has a first damper mass and a second damper mass spaced apart from the first damper mass in such a way as to define a second enclosed inner acoustic volume therebetween, wherein a first density of the first damper mass, is approximately fifty percent lower relative to a second density of the second damper mass, and wherein a second maintain distance of the second inner acoustic volume ranges between one and ten millimeters.

These and other features, aspects and advantages of the present invention will become better understood with reference to the following drawings, description and claims.

DETAILED DESCRIPTION OF THE INVENTION

Figure 1:
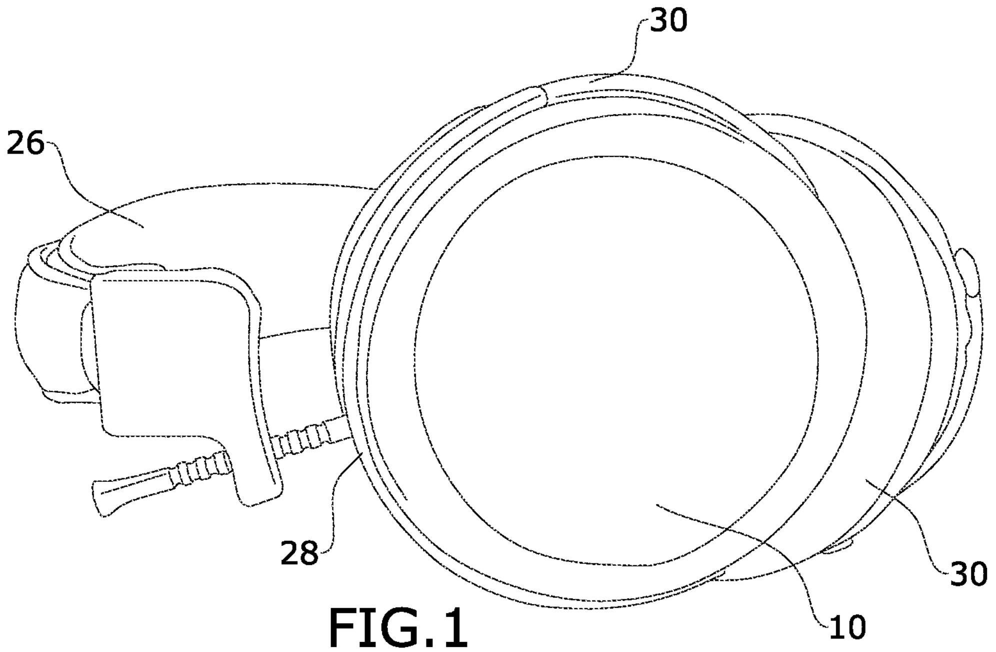
FIG. 1 is a perspective view of an exemplary embodiment of the present invention, shown in an assembled condition, illustrating two housings 10 interconnected by a headband 26 operatively associating with a housing bracket 28 of each respective housing 10.
Figure 2:
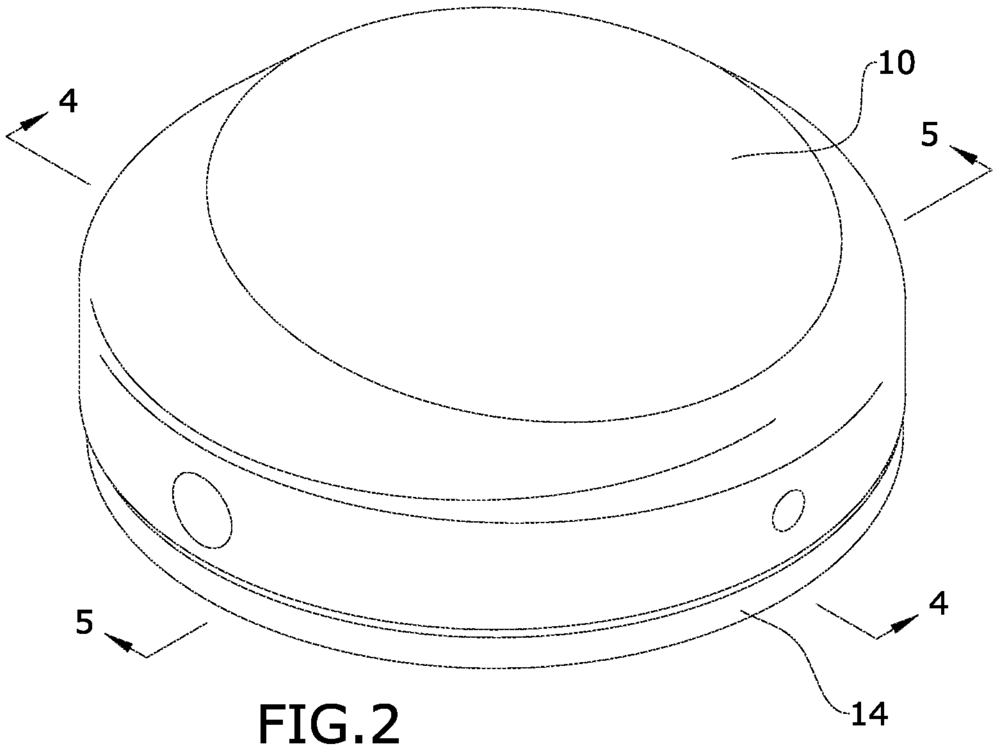
FIG. 2 is a perspective view of an exemplary embodiment of a driver holder of the present invention.
Figure 3:
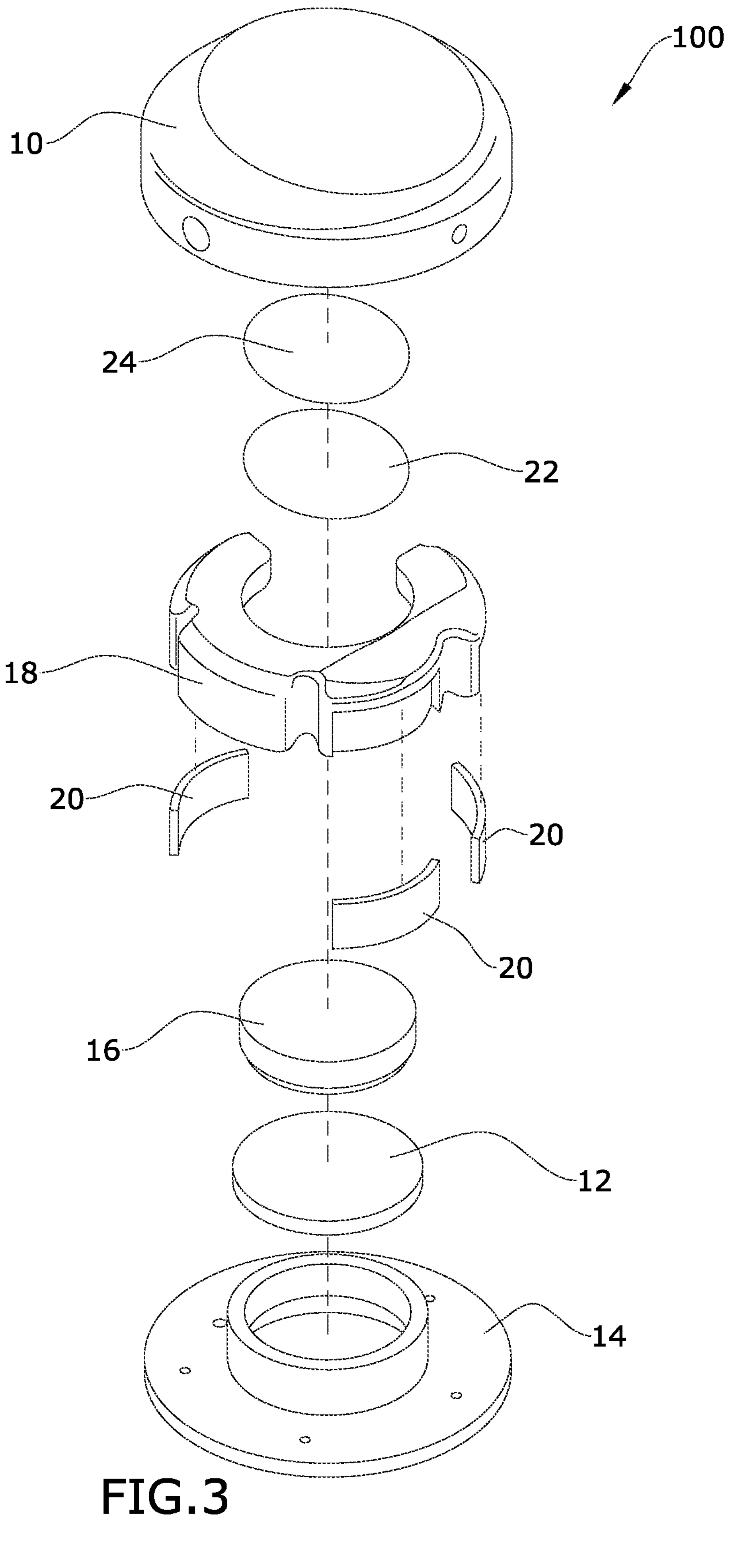
FIG. 3 is an exploded perspective view of an exemplary embodiment of the driver holder of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Referring now to FIGS. 1 through 9, the present invention may include an acoustical damping system 100 for headphones. Each headphone has an earcup compartment defined by a housing 10, an internal driver 12 and a portion of an ear area of the wearer that is circumscribed when the earcup is worn. As a result, the compartment has a rear volume 50 rearward of the driver 12 and a front volume 48 forward of the driver 12.

Figure 4:
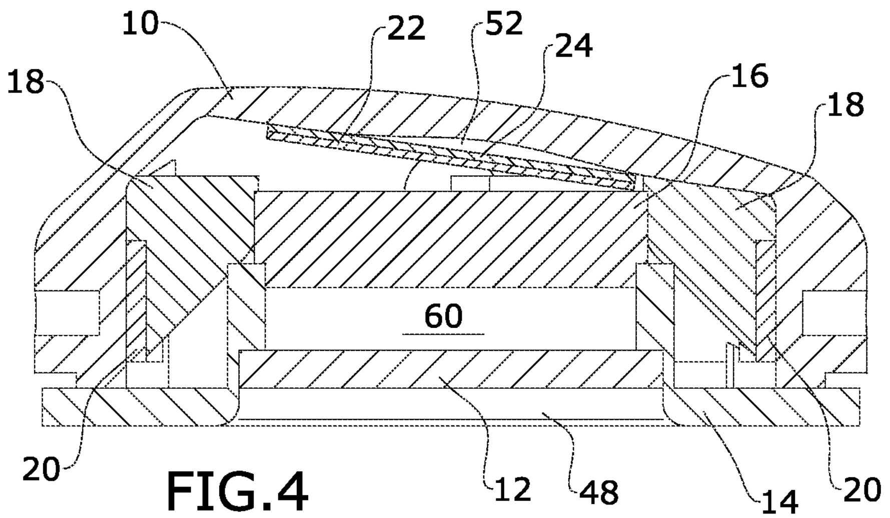
FIG. 4 is a section view of an exemplary embodiment of the present invention, taken along line 4-4 in FIG. 2.
Figure 4A:
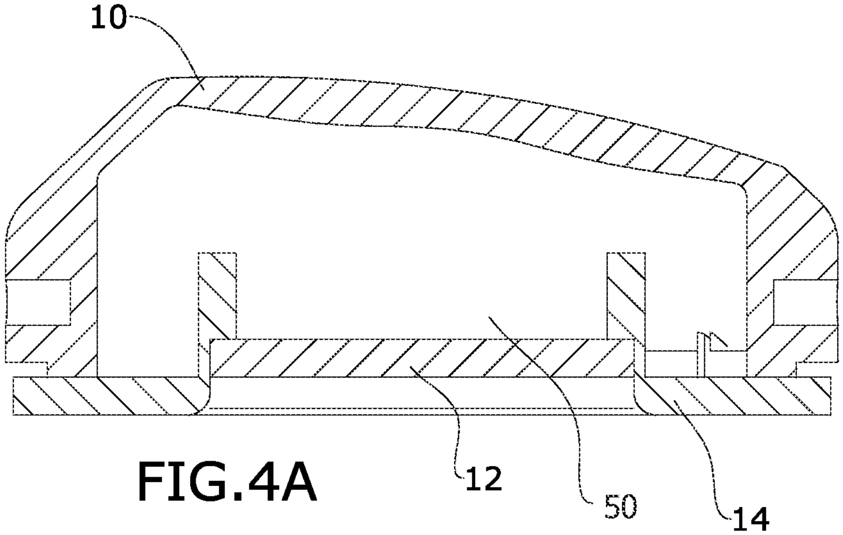
FIG. 4A is a section view of FIG. 4, with damping system components removed to clearly show the original rear volume 50.

A driver holder 14 operatively associates with the driver 12, facilitating the connection to the housing 10. The driver holder 14 further defines the sides of the front volume 48, as illustrated in FIG. 4. Spaced apart from the driver 12, in a rearward direction thereof, a baffle damper 16 defines an inner rear acoustic volume 60. The baffle damper 16 may be approximately concentric and have a forward surface 17 area that is generally coextensive with an upper surface 13 of the driver 12. In certain embodiments, the driver holder 14 engages the lower portion of the baffle damper 16, thereby circumscribing and thus enclosing the inner rear acoustic volume 60 that is also defined by said forward surface 17 of the baffle damper 16 and the rearward surface 13 of the driver 12.

Figure 5:
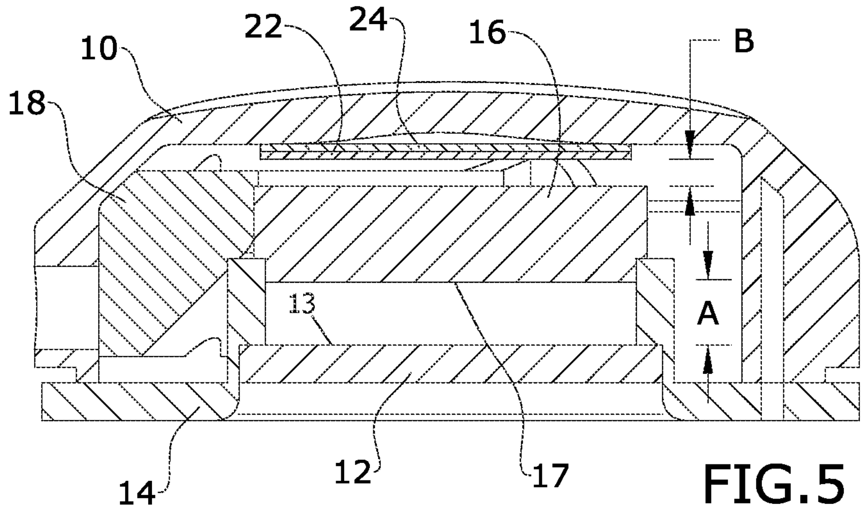
FIG. 5 is a section view of an exemplary embodiment of the present invention, taken along line 5-5 in FIG. 2.
Figure 6:
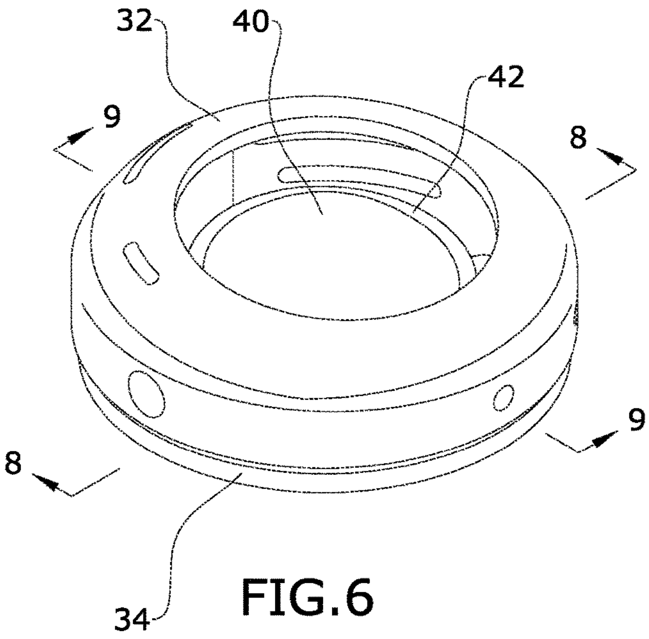
FIG. 6 is a perspective view of an exemplary embodiment of an open-back housing of the present invention.
Figure 7:
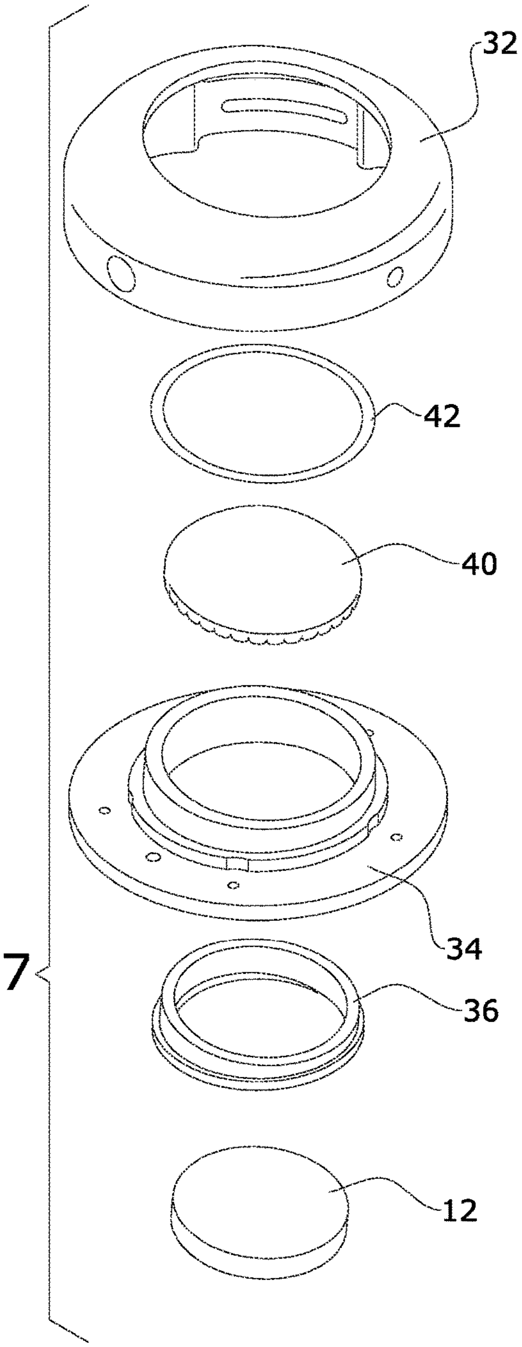
FIG. 7 is an exploded perspective view of an exemplary embodiment of the open-back housing of the present invention.

An inner maintained distance 'A', as illustrated in FIG. 5, between the forward surface 17 of the baffle damper 16 and the rearward surface 13 of the driver 12 may range approximately between one and ten millimeters (mm).

An arcuate edge damper 18 may occupy a portion of the rear volume 50. The edge damper 18 may fully or partially circumscribes the baffle damper 16. The edge damper 18 may be in communication with the sides of the baffle damper 16 (e.g., an upper/rearward portion of the driver holder 14, a portion of the inner side walls of the housing 10, and possibly a portion of an inner portion that faces forward of the housing 10, as illustrated in FIG. 4). Along an outer perimeter of the arcuate damper 18 may be a plurality of side dampers 20 spaced apart there along.

Rearward of and spaced apart from the baffle damper 16, is a first damper mass 22 and a second damper mass 24. The first and second damper masses 22 and 24 may be in a stacked orientation relative to each other and may be aligned and generally concentric relative to the baffle damper 16. The first and second damper masses 22 and 24 may be spaced apart from the rearmost inner wall of the housing 10/earcup by a rearmost distance 52, as illustrate in FIG. 4. While in some embodiments, a rear surface of the second damper mass 24 may engage an inner surface of the housing 10.

An outer maintain distance 'B', as illustrated in FIG. 5, between the forward surface 21 of the first damper mass 22 and the rearward surface 19 of the baffle damper 16 may range approximately between one and ten mm.

The damper masses may be made of acoustic foam, cork or an equivalent material/mass. Note, density can be calculated with acoustic foam by PPI (Pores Per Inch), or by the weight of the material (i.e., how much pressure it takes to deform the material). The baffle damper 16, the edge damper 18, the side dampers 20, the first damper mass 22, and the second damper mass 24 may have different densities ranging between 1 and 200 PPI and between 1 and 20 LB density. The relative densities of the first and second damper masses 22 and 24 differ by approximately 50% by PPI. The baffle damper 16 may have a lower relative density than the first damper mass 22, and the first damper mass 22 may have a lower relative density than the second damper mass 24.

The acoustical damping system 100 is disposed rearward of the driver 12, causing both intrinsic pressure that a headphone or any acoustic driver maintains as it reaches the human eardrum, as well as diffusing any unwanted frequency response as it does so. The rearward acoustic waves of the driver 12 enter the inner rear volume 60 and the rearward acoustic waves then travel through between the density, viscosity, and pressure of the medium that is the baffle damper 16. The medium of the baffle damper 16 diffuses and thereby controls these sound waves as they enter the rearmost portion of the rear volume 50.

Note, the acoustic damping material of the first and second damper masses 22 and 24 evenly spreads out the sound waves in the rearmost portion of the rear volume 50 of the headphone, so that when they do inevitably bounce off the rear volume surface of the headphone cup design, they do not collide and create standing waves.

The arrangement of the first and second damper masses 22 and 24 enables a designer to selectively control the intrinsic pressure to a more desired or specified result which is measurable through, impulse response, square wave, distortion, and waterfall plots, as well as frequency response.

Referring to FIGS. 6 through 9, in an open-back headphone embodiment air is only allowed to escape in a controlled manner. That air is kept pressurized, allowing a more neutral response to be tuned without losing dynamic impact that can be shown through impulse response. As a result, in a closed enclosure, instead of having too much bass, the same system allows that built-up pressure to be diffused through the edge damper 18 of the earcup with damping material of variable densities absorbing the unwanted acoustical sound waves as needed to achieve the desired result. Note, an optimal sound pressure can be found for each driver 12 through the ability to selectively control the air that is allowed to escape and how diffuse it is, by way of the placement of the dampers and their selected density. Thereby, the optimal sound pressure can be selectively determined for each driver.

The open-back headphone has an open-back housing 32 with a modified open-back driver holder 36 for the driver 12. The open-back housing 32 is dimensioned and adapted to house a baffle holder 34 that operatively associates with an open-back damper mass 40 located rearward of the driver 12. A retaining ring 42 may fix the location of the open-back damper mass 40 relative to the driver 12—i.e., defining a first inner rear volume 61. The open-back damper mass 40 may have a planar first damper mass 41 and a dome-like second damper mass 43, wherein the relative densities of the first and second damper masses 41 and 43 differ by approximately 50 percent by PPI. The second damper mass 43 may also have a dome curvature that encloses a second inner rear volume 62 between the first and second damper masses 41 and 43.

Similar to the closed-back configuration, the first inner rear volume 61 may be enclosed by the first damper mass 41, the driver 12, and the baffle holder 34, wherein first damper mass 41 is generally concentric and parallel with the driver 12 and possibly wherein the forward facing surface of the first damper mass 41 may be generally (or at least) concentric with the driver 12.

An inner maintained distance of the first inner rear volume 61 between the forward surface of the first damper mass 41 and the rearward surface 13 of the driver 12 may range approximately between one and ten mm.

Figure 8:
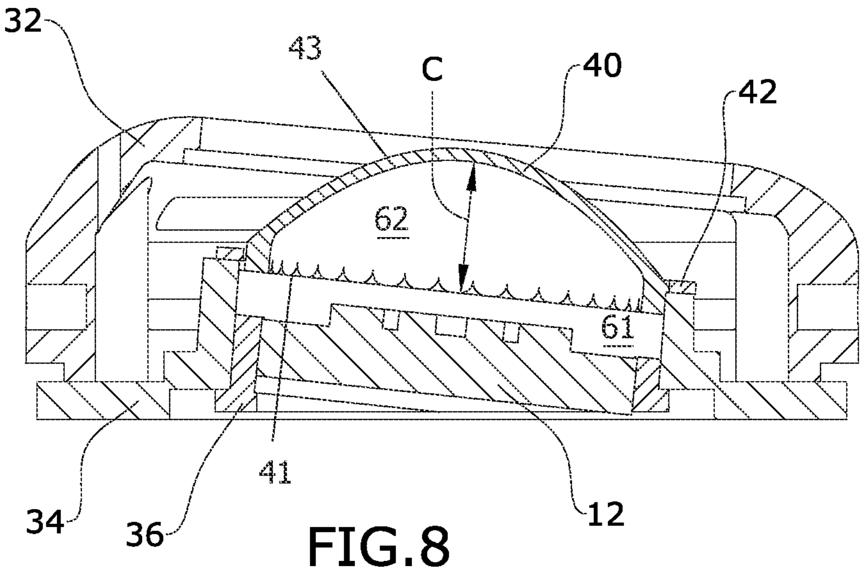
FIG. 8 is a section view of an exemplary embodiment of the open-back housing of the present invention, taken along line 8-8 in FIG. 6.

An outer maintain distance 'C' of the second inner rear volume 62—between the first and second damper masses 41 and 43, as illustrated in FIG. 8—may range between zero and twenty mm as a function of the curve of the dome curvature, the maintain distance obviously being maximum at the dome's apex.

Figure 9:
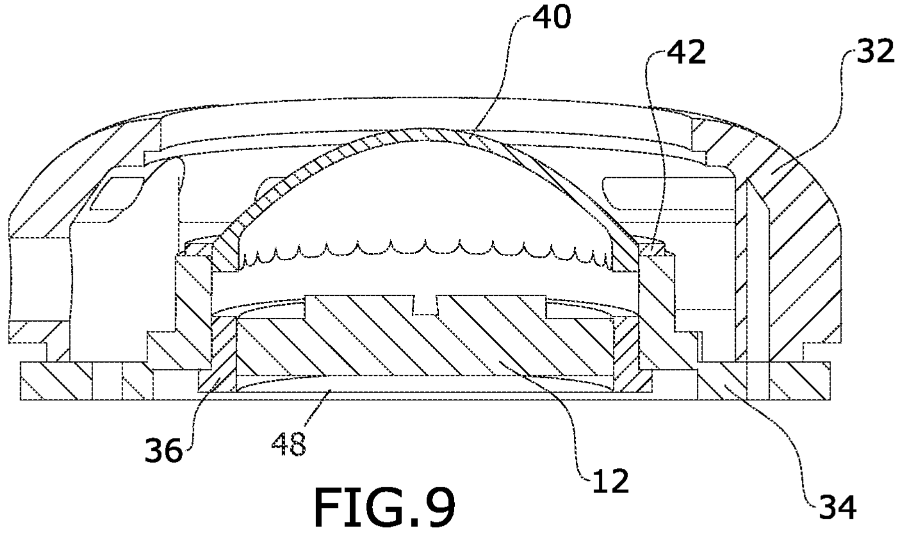
FIG. 9 is a section view of an exemplary embodiment of the open-back housing of the present invention, taken along line 9-9 in FIG. 6.

The driver 12 and the dampers 18, 20, 22, 24, 38 and 40 work in conjunction with each other to provide a system where instead of sound waves being started or stopped, they are slowed down and directed in a very specific manner to provide a quick and easy way to tune an open-back, closed-back, or semi-open open-back, closed-back, or semi-open headphone. The direction of diffusion is selective based on the radius of the damping material. As shown in FIGS. 4 and 5 baffle pad 16 is flat. As shown in FIGS. 8 and 9 the open-back damper mass 40 is radiused (along the second damper mass 43). These materials can be between a thickness of 1⁄16" and two inches and radiused anywhere from 0 to a 90-degree radius. The radius and thickness cause the selective process. The radius facilitates the sound waves reflecting or refracting at different angels depending on where along the entirety of the radiused second damper mass 43 surface they contact it.

In certain embodiments, the first damper mass 41 may not be a mass (i.e., have a density of zero, or be one pore).

Note, the airflow (sound waves) is controlled by the variable damping mechanism shown in FIGS. 8 and 9 as damper 40 and as baffle pad 16 in FIGS. 4 and 5. These pieces work in conjunction with volume of the headphone earcup. The variable "domed" or "radius" of the damper 40 and the baffle pad 16 will spread out the sound waves after entering and exiting the damping material.

The acoustical damping system 100 enables a pleasing response to the listener without cutting out unwanted frequencies, all while retaining sound pressure to sound enjoyable to the end user. The acoustical damping system 100 offers selective control of how much to smooth the frequencies, and what frequencies are affected is controlled by the density and type of material used.

Specifically, what is enjoyable can be defined through frequency response graphs that meet the target curves of which are standard in our industry, or by graphs that each manufacturer of headphones assigns. One example is the Sean Olive researched "Harman Target Curve" where we either keep in his elevated bass response, or we remove it to tune to a more audiophile friendly objective. While his research shows that listeners tend to enjoy a boosted bass, it does not take into account how that is achieved via airflow and acoustical damping, whether the headphone is open or closed, or how different approaches to this response can affect the listeners preferences.

The present invention will allow for that increased impact or bass response to be perceived by the listener, but with less measured bass response, which in end will lessen distortion, and provide a safer listening experience with less bass needing to be tuned into headphones. By increasing the damping material at a closer/decreased distance to the pinna/ear, the sound wave has less time to diffuse. Sound dissipates as it travels, and by making the distance shorter the bass frequencies (between 10 HZ and 300 HZ) will travel easier than frequencies that are higher, as those frequencies will be retained more than the higher frequencies, causing great perceived "impact."

A method making the present invention may include gathering acoustical damping materials and use a thickness cutter to cut the material to variable densities between approximately 1⁄16-inch and 1-inch thickness. Then the acoustical damping materials may be laser cut to the size of the driver and to the overall diameter of the driver; in short, the present invention/damping method, can be cut to accommodate the size of the driver. The manufacture may use an outer ring or other sufficient attachment means to put the damping materials rearward of the driver 12, making sure that there is a baffle 16 in place to create a maintain distance between the first damper mass 22 and the second damper mass 24.

The maintain distances between the damping/systemic components can be changed to suit the best need of the driver, in certain embodiments that damping distance is between 0 and 1 inch to suit a broad range.

The manufacturing process may include changing the placement, distance, type of material or orientation after doing acoustical measurements to see which material works best with the driver system used. Different damping materials can be used, we think the formation of the materials is important, and it can include any material used to damp the system.

A method using the present invention may be provided. The acoustic damping system 100 disclosed above may be provided. A headphone design would use the acoustic damping system 100 to save time and money to make their headphones sound as good as possible. In the past headphone designers have not used chambered airflow systems that are variable to the absolute design of the headphone. The system embodied in the present invention solves that problem by saving time and having a system that is more universal in use to a broad range of headphones.

As used in this application, the term "about" or "approximately" refers to a range of values within plus or minus 10% of the specified number. And the terms "generally" and "substantially" refer to between 110% to 90% or more of an entirety—e.g., if a component is "generally" concentric with another component it is 90 to 110% concentric, relatively.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A damping system for a rear volume of an ear cup, the system comprising:

a driver;

a housing, in conjunction with the driver, defining the rear volume; and a baffle damper disposed rearward of the driver in such a way as to define an enclosed inner acoustic volume, wherein the baffle damper is configured to control soundwaves through diffusion, and wherein the baffle damper is spaced apart forward of a rear portion of the housing, wherein the baffle damper is spaced apart from the driver by a maintain distance having a range between one and ten millimeters.

2. The system of claim 1, further comprising a driver holder engaging both the driver and the baffle damper, and wherein the driver holder circumscribes the enclosed inner acoustic volume.

3. The system of claim 1, wherein the baffle damper is substantially concentric with the driver.

4. The system of claim 1, wherein a forward surface of the baffle damper is substantially coextensive relative to a rearward surface of the driver.

5. The system of claim 1, further comprising a first damper mass spaced apart forward from the rear portion of the housing, wherein the first damper mass is spaced apart rearward of the baffle damper.

6. The system of claim 5, further comprising a second damper mass rearward of the first damper mass and in a stacked orientation relative thereto, and wherein the second damper mass is concentric relative to the baffle damper.

7. The system of claim 6, wherein the baffle damper has a baffle density, wherein the baffle density is lower than a first density of the first damper mass, and wherein the first density is approximately fifty percent lower relative to a second density of the second damper mass.

8. A damping system for a rear volume of a closed-back ear cup, the system comprising:

a driver;

a housing, in conjunction with the driver, defining the rear volume; and a baffle damper disposed rearward of the driver in such a way as to define an enclosed inner acoustic volume, and wherein the baffle damper is spaced apart forward of a rear portion of the housing, wherein the baffle damper is configured to control soundwaves through diffusion, and wherein the baffle damper has a Pores Per Inch (PPI) density of less than 100.

9. The system of claim 8, further comprising a driver holder engaging both the driver and the baffle damper, and wherein the driver holder circumscribes the enclosed inner acoustic volume.

10. The system of claim 8, wherein the baffle damper is substantially concentric with the driver.

11. The system of claim 8, wherein a forward surface of the baffle damper is substantially coextensive relative to a rearward surface of the driver.

12. The system of claim 8, further comprising a first damper mass spaced apart forward from the rear portion of the housing, wherein the first damper mass is spaced apart rearward of the baffle damper.

13. The system of claim 12, further comprising a second damper mass rearward of the first damper mass and in a stacked orientation relative thereto, and wherein the second damper mass is concentric relative to the baffle damper.

14. The system of claim 13, wherein the baffle damper has a baffle density, wherein the baffle density is lower than a first density of the first damper mass, and wherein the first density is approximately fifty percent lower relative to a second density of the second damper mass.

15. A damping system for a rear volume of a closed-back ear cup, the system comprising:

a driver;

a housing, in conjunction with the driver, defining the rear volume; and a baffle damper disposed rearward of the driver in such a way as to define an enclosed inner acoustic volume, and wherein the baffle damper is spaced apart forward of a rear portion of the housing, wherein the baffle damper is configured to control soundwaves through diffusion, wherein the baffle mass is spaced apart from the driver by a maintain distance having a range between one and ten millimeters.

16. The system of claim 15, further comprising a baffle holder engaging both a driver holder of the driver and the baffle mass, and wherein the driver holder circumscribes the enclosed inner acoustic volume.

17. The system of claim 15, wherein the baffle mass has a dome-like shape that defines a rear portion of the enclosed inner acoustic volume.

18. The system of claim 15, wherein the baffle mass has a first damper mass and a second damper mass spaced apart from the first damper mass in such a way as to define a second enclosed inner acoustic volume therebetween.

19. The system of claim 18, wherein a first density of the first damper mass, is approximately fifty percent lower relative to a second density of the second damper mass.

* * * * *